March 6, 1962  H. F. W. MARUHN  3,024,041
WHEEL SUSPENSION FOR MOTOR VEHICLES
Filed Sept. 22, 1958
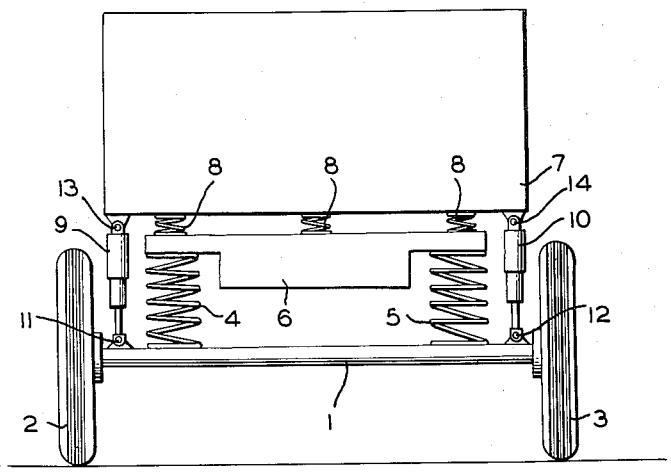
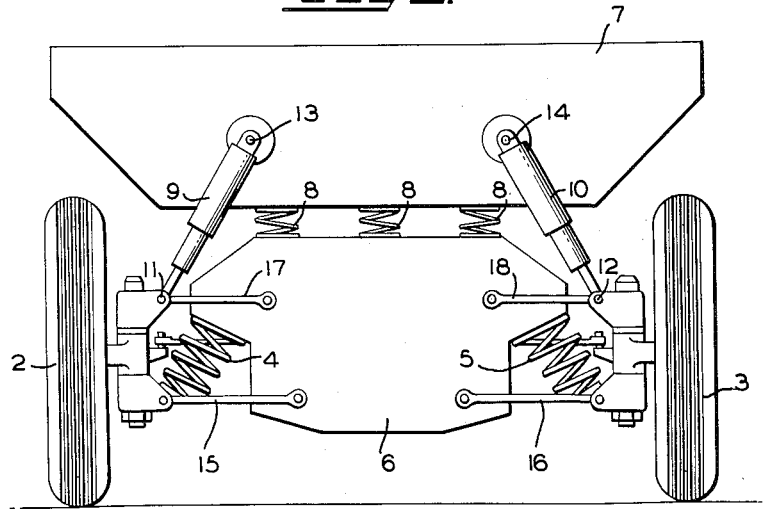
INVENTOR.
HERERT F.W. MARUHN
BY Dicke and Craig
ATTORNEYS United States Patent Office 3,024,041
Patented Mar. 6, 1962

3,024,041
WHEEL SUSPENSION FOR MOTOR VEHICLES
Herbert F. W. Maruhn, Stuttgart-Uhlbach, Germany, assignor to Daimler-Benz Aktiengesellschaft, Stuttgart-Unterturkheim, Germany
Filed Sept. 22, 1958, Ser. No. 762,540
3 Claims. (Cl. 280—106.5)

The present invention relates to an arrangement of the springs and shock absorber at the wheel axle members or at the wheel guiding members of motor vehicles in which the wheel axle members or wheel guiding members for but one pair of wheels on opposite sides of the vehicle are arranged at an auxiliary frame, or at an intermediate frame-like member, or the like, which is resiliently or elastically supported with respect to the mass of the vehicle, the vehicle superstructure, the main frame carrying the vehicle body or the vehicle body of a self-supporting type vehicle body construction, whereby the auxiliary frame or intermediate member may carry the drive aggregate or unit and/or substantial parts thereof either entirely or partially.

The present invention consists in that the springs are supported, on the one hand, at the wheel axle members or wheel guiding members and, on the other, at the auxiliary frame or intermediate member which is elastically or resiliently supported with respect to the spring-supported mass of the vehicle, and in that the shock absorbers are supported, on the one hand, at the wheel axle members or wheel guiding members and, on the other, at the spring-supported mass of the vehicle, for example, at the main frame with the vehicle body or at the body structure of a self-supporting type body construction.

In motor vehicle constructions, especially passenger motor vehicle constructions, it is desirable to follow a direction in the development thereof which aims at constructing or providing a suspension of the intermediate members for the pivotal connection or suspension of the wheel axle members or wheel guiding members, such as for the auxiliary frame, intermediate frame-like member, or the like, at the main mass of the vehicle, for example, at the vehicle body, which is as soft as possible for reasons of damping vibrations, insulating swinging movements, etc. Whereas the shock absorber arrangements used heretofore do not take into consideration the swinging movements occurring between the auxiliary frame or intermediate member and the main mass of the vehicle, the present application is concerned with providing an arrangement to subject also these spring movements to a damping action in order to thereby encompass in a particularly advantageous manner all parts also resiliently suspended with respect to the main mass of the vehicle as regards any swinging movements which may occur. The shock absorbers are thereby intended to damp the swinging movements or oscillations of the springs which may occur, i.e., to dissipate also the energy, in contrast to stabilizers used in spring systems which change the spring system, for example, in the sense of a spring-stiffening action.

According to a further feature of the present invention, the shock absorbers, for example, hydraulic telescopic shock absorbers may be advantageously suspended or connected in proximity to the wheel at the upper triangularly shaped guide member with a wheel suspension including wheel guiding members of triangular shape arranged one above the other.

Accordingly, it is an object of the present invention to provide a wheel suspension which obviates the shortcomings of the prior art devices and which absorbs not only the swinging movements and shocks which may occur between the wheels and the auxiliary frame from which the wheels are suspended, but also the swinging movements, vibrations and shocks which may occur between the auxiliary frame and the vehicle superstructure such as the main frame or the vehicle body of a self-supporting type vehicle body construction.

It is another object of the present invention to provide with a vehicle construction including a vehicle superstructure, an auxiliary frame and a wheel suspension for the wheels, suspended for the most part from the auxiliary frame, in which the shock absorbers are used in such a manner as to reduce all vibrations, swinging movements and shocks from reaching the vehicle superstructure.

These and other objects, features and advantages of the present invention will become more obvious from the following description when taken in connection with the accompanying drawing, which shows, for purposes of illustration only, two embodiments in accordance with the present invention, and wherein:

FIGURE 1 is an end view of a wheel suspension in accordance with the present invention for a motor vehicle provided with a rigid axle member, and FIGURE 2 is an end view of a wheel suspension in accordance with the present invention for a vehicle having an independent wheel suspension including triangularly shaped guide members.

Referring now to the drawing, wherein like reference numerals are used throughout the various views to designate like parts, and more particularly to FIGURE 1, reference numeral 1 designates therein the rigid axle member of a motor vehicle which, together with the wheels 2 and 3 mounted thereon, is elastically supported with respect to the auxiliary frame 6 constructed as an intermediate frame member by means of springs 4 and 5 which may be of any suitable construction, such as, for example, coil springs. The intermediate frame-like member or auxiliary frame member 6 in turn is elastically connected with the main vehicle mass or vehicle superstructure 7, for example, with the main frame carrying thereon the vehicle body or the vehicle body of the self-supporting type body construction, by the interposition of elastic members 8, for example of springs, rubber cushions or the like. The shock absorbers 9 and 10, which are preferably constructed as hydraulic telescopic shock absorbers, are operatively connected, on the one hand, at the pivotal connections 11 and 12 with the rigid axle member 11 in proximity to the wheels 2 and 3, and, on the other, at the pivotal connections 13 and 14 directly with the main mass or superstructure 7 of the vehicle so that swinging movements of the springs 8 between the intermediate or auxiliary member 6 and the main mass 7 are also subjected to a damping action by the shock absorbers 9 and 10. The shock absorbers 9 and 10 provide a high degree of damping relative to the springs 4 and 5 which may be substantially frictionless so that shocks of large magnitude at the wheels are transmitted therefrom to the vehicle superstructure 7 through the shock absorbers, thus protecting the auxiliary frame member 6 from such shocks.

In the embodiment of the motor vehicle according to FIGURE 2, the wheels 2 and 3 thereof are pivotally connected and suspended from the intermediate or auxiliary frame member 6 by means of triangularly shaped upper guide members 17 and 18 and by means of triangularly shaped lower guide members 15 and 16, respectively. The springs 4 and 5 are supported on the lower guide members 15 and 16 respectively and at the intermediate or auxiliary frame member 6 which in turn is elastically connected with the superstructure or main mass 7 of the vehicle by means of elastic elements 8 which again may be, for example, springs, rubber cushions or the like. The shock absorbers 9 and 10 are operatively connected, on the one hand, at the pivotal connections 11 and 12 thereof with the upper guide members 17 and 18 in proximity to the wheels 2 and 3 and, on the other, directly with the main mass or superstructure 7 of the vehicle at the pivotal connections 13 and 14 thereof so that in this case also the swinging movements of the springs 8 between the intermediate or auxiliary member 6 and the main mass 7 are subjected to an effective damping action.

While I have shown and described two embodiments in accordance with the present invention, it is understood that the same is not limited thereto but is susceptible of many changes and modifications within the scope and spirit of the present application. For example, any type of intermediate or auxiliary frame and any suitable spring and/or shock absorber construction may be used in connection with the wheel suspension, which in turn may be of any conventional type known in connection with the particular type of axle used, i.e., with either a rigid axle, a swinging half axle or an independent wheel suspension.

The term "vehicle superstructure" is used in the specification and claims herein to designate the main mass of the vehicle such as the main frame carrying the vehicle body or the body of a self-supporting type body construction.

Thus, it is obvious that the present invention is susceptible of many changes and modifications, and I, therefore, do not wish to be limited to the two embodiments illustrated herein but intend to cover all such changes and modifications as encompassed by the scope of the claims.

I claim:

1. A wheel suspension for the wheels of motor vehicles, comprising a vehicle superstructure, a pair of oppositely disposed wheels, auxiliary frame means associated with said pair of wheels on opposite sides of the vehicle, means elastically connecting said auxiliary frame means with said vehicle superstructure, wheel suspension means for suspending said pair of wheels from said auxiliary frame means including two wheel guiding means disposed one above the other for each of said wheels, spring means supported, on the one hand, against the lower one of said wheel guiding means and, on the other hand, against said auxiliary frame means, and telescopic hydraulic shock absorber means pivotally supported, on the one hand, against the upper one of said wheel guiding means and, on the other, against said vehicle superstructure, said shock absorber means being so constructed and arranged as to provide a high degree of dampening relative to the dampening in said spring means, said arrangement and construction of the shock absorber means and spring means reducing oscillations at the latter to such an extent that shocks of large magnitude at said wheels are transmitted therefrom to said vehicle superstructure by said shock absorber means to substantially reduce the imposition of large shocks on the auxiliary frame.

2. A wheel suspension for the wheels of motor vehicles, comprising a vehicle superstructure, at least one pair of oppositely disposed wheels, auxiliary frame means associated with said pair of wheels on opposite sides of the vehicle, means elastically connecting said auxiliary frame means with said vehicle superstructure, wheel suspension means for suspending said pair of wheels from said auxiliary frame means including substantially transversely extending guide arms pivotally mounted at said auxiliary frame and spring means supported, on the one hand, against a respective guide arm of said wheel suspension means and, on the other, against said auxiliary frame means and shock absorber means supported, on the one hand, against a respective guide arm of said wheel suspension means and, on the other, against said vehicle superstructure, said shock absorber means being so constructed and arranged as to provide a high degree of dampening relative to the dampening in said spring means, said arrangement and construction of the shock absorber means and spring means reducing oscillations at the latter to such an extent that shocks of large magnitude at said wheels are transmitted therefrom to said vehicle superstructure by said shock absorber means to substantially reduce the imposition of large shocks on the auxiliary frame.

3. A wheel suspension for the wheels of motor vehicles, comprising a vehicle superstructure, a pair of oppositely disposed wheels, a rigid axle member supporting thereon said pair of wheels, auxiliary frame means associated with said pair of wheels on opposite sides of the vehicle, means elastically connecting said auxiliary frame means with said vehicle superstructure, wheel suspension means for suspending said pair of wheels from said auxiliary frame means including coil spring means for each of said wheels supported, on the one hand, against said axle member and, on the other, against said auxiliary frame means, and hydraulic shock absorber means for each of said wheels pivotally supported, on the one hand, against said axle member outwardly of the respective coil spring means and, on the other, against said vehicle superstructure, said shock absorber means being so constructed and arranged as to provide a high degree of dampening relative to the dampening in said spring means, said arrangement and construction of the shock absorber means and spring means reducing oscillations at the latter to such an extent that shocks of large magnitude at the wheels are transmitted therefrom to the vehicle superstructure by said shock absorber means to substantially reduce the imposition of large shocks on said auxiliary frame means.

References Cited in the file of this patent

UNITED STATES PATENTS 2,888,269    Hogsten _____ May 26, 1959

FOREIGN PATENTS 763,907    France _____ Feb. 19, 1934